Oct. 15, 1963  G. SANDNES  3,106,904
ROPE AND CABLE VISE LOCK OR STOPPER
Filed May 14, 1962
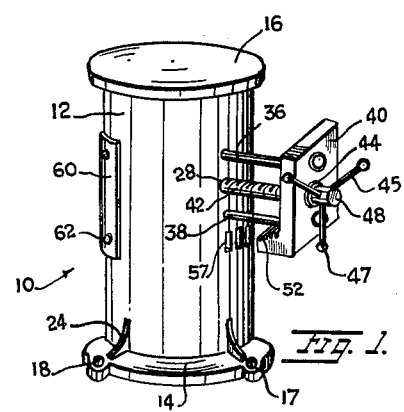
Fig. 1.
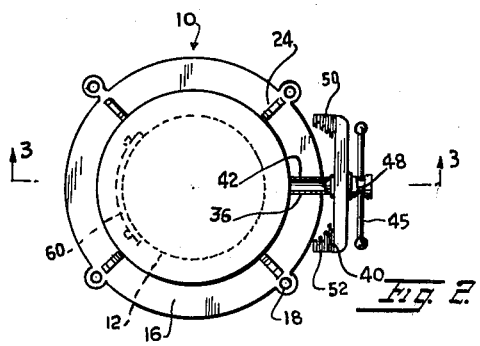
Fig. 2.
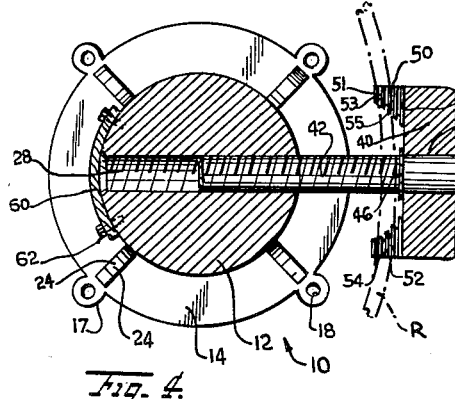
Fig. 4.
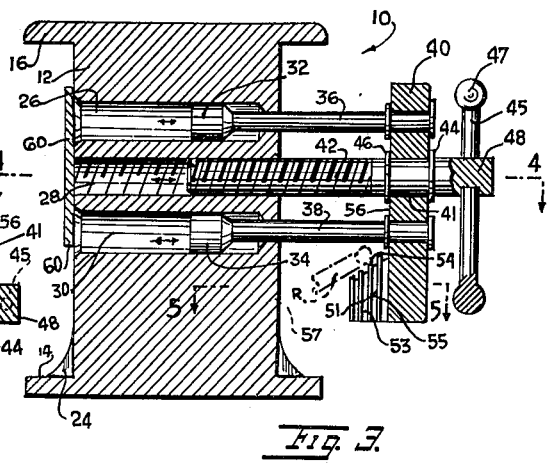
Fig. 3.
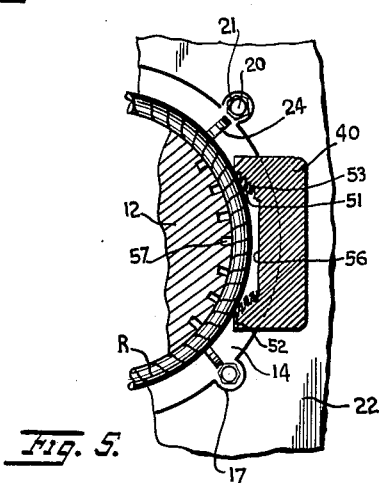
Fig. 5.
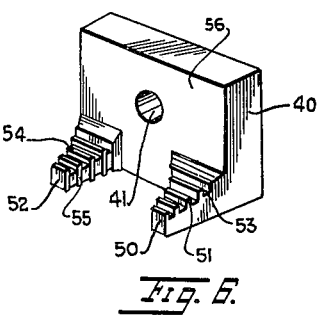
Fig. 6.
INVENTOR.
GOTTFRED SANDNES
BY
ATTORNEY

United States Patent Office 3,106,904
Patented Oct. 15, 1963

3,106,904
ROPE AND CABLE VISE LOCK OR STOPPER
Gottfred Sandnes, 216 78th St., Brooklyn, N.Y.
Filed May 14, 1962, Ser. No. 194,528
2 Claims. (Cl. 114—199)

This invention concerns a rope and cable vise, lock or stopper particularly useful on shipboard for securing mooring ropes and cables.

Heretofore various rope locks and stoppers have been used on shipboard. These locks have been difficult and dangerous to use, particularly when the ropes are wet, frozen, icy or slippery. The prior rope stoppers used on shipboard have required two or more men to handle them for securing rope lines. These prior rope stoppers designed for marine use have frequently loosened and slipped, resulting in many accidents and damages to ships, docks and cargo.

The present invention is directed at overcoming the above and other difficulties and disadvantages, by providing a rope vise, lock or stopper which permits one man, or at most two men, to handle and secure a ship's lines easily, quickly, evenly and securely without slipping or sagging. The rope vise operates equally well with wire cable or rope and can be used with all sizes ranging from about one-half inch in diameter to fourteen inches in diameter, without any damage to the cable or rope. The device is particularly useful for mooring boats and vessels of all sizes up to the largest modern types of ocean going ships. The device can exert a grip up to a hundred tons, in larger sizes, to exceed the breaking strength of the rope or cable.

According to the invention there is provided a vise-like device which has a cylindrical post provided with a clamp plate carrying clamping jaws. The clamp plate is supported on guide bolts slidable in the cylindrical post and is advanced and retracted by a manually turnable helical screw for securing and easing off on a rope or cable.

It is therefore a principal object of the invention to provide a rope or cable vise or lock intended for shipboard installation to stop slippage and secure ropes and cables of different sizes.

A further object is to provide a device as described which is manually operable for quick engagement and quick loosening of ropes and cables.

Still another object is to provide a vice-like device for securing mooring ropes and cables of boats and ships of various sizes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a device embodying the invention.

FIG. 2 is a top plan view of the device.

FIG. 3 is a vertical sectional view on an enlarged scale taken on line 3—3 of FIG. 2.

FIG. 4 is a horizontal sectional view taken on line 4—4 of FIG. 3.

FIG. 5 is a fragmentary sectional view taken on line 5—5 of FIG. 3 showing the device in installed, operating, closed position.

FIG. 6 is a perspective view of the clamp plate.

Referring to the drawings, there is shown the device 10 including a cylindrical axially vertical massive iron body or post 12 with an annular base flange 14 and an annular top flange 16 both extending radially of the post 12. Radial eyelets 17 are formed at the periphery of flange 16. These eyelets have holes 18 for receiving bolts 20 engaged by nuts 21 to mount the device on the deck 22 of a ship; see FIGS. 1–5. Ribs 24 extend from flange 14 to the post at eyelets 17 to reinforce the mounting structure. Three coplanar horizontal diametral bores 26, 28 and 30 are formed in the post 12. Bores 26 and 30 are smooth and slidably receive piston heads 32, 34. Piston rods 36, 38 are secured to or integral with the heads 32, 34 and extend outwardly of the post 12. The outer ends of rods 36, 38 are secured in a clamp plate 40. The rods 36, 38 serve as supports for the plate 40 and the piston heads serve as guides to limit the plate to horizontal movement toward and away from post 12. A helically threaded screw shaft 42 is threaded in bore 28 which is threaded for substantially its entire length. The outer end of shaft 42 is rotatably held in a hole 41 in plate 40 by flanges 44, 46 at opposite sides of the plate 40. Three angularly spaced handles 45 are secured in the outer hub end 48 of shaft 42.

The plate 40 has two spaced tapered, wedge-shaped jaws 50, 52 at its lower end extending inwardly toward body 12. These jaws are formed with ridges 51 and grooves 53 on top and inner sides 54, 55 of the jaws. The jaws have curved inner sides 55 facing the post 12 and corresponding in curvature to the outer surface of the cylindrical post 12. The upper sides 54 of the jaws slant upwardly toward the inner surface 56 of plate 40. A plurality of axially extending spaced recesses 57 are formed in post 12 opposite to the jaws 50, 52.

FIGS. 1–4 show the clamp plate 40 spaced from post 12. A rope R indicated by dotted lines is engaged on the ridges and grooves of jaws 50, 52 under guide rod 33. FIG. 5 shows the clamp plate 40 advanced up to the post 12. The rope R is now engaged between the grooved curved faces 55 of the jaws and the recesses 57 of the post 12. The rope R is securely held under pressure maintained by the tightened screw thread engagement of shaft 42 in bore 28.

A closure plate 60 secured by bolts 62 is mounted on the rear side of post 12 opposite from plate 40. The bores 26, 28 and 30 are open at the rear side of post 12. When plate 60 is removed, access is provided to bores 26, 28, 30 for applying of suitable lubricant to lubricate the sliding and turning members 32, 34, 36, 38, 42 in the bores.

The handles 45 may terminate in knobs 47. The handles can be turned by one or two men. The wedge-shaped jaws 50, 52 engage a rope or cable and in coaction with post 12 and hold it in a vise-like grip preventing slippage. When it is desired to ease off on the rope, the handles 45 are turned to loosen screw shaft 42.

The invention makes it possible to moor a ship to a dock by quickly and easily securing its lines in a safe and simple manner.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A vise-like lock for a rope or cable comprising a cylindrical body having an annular radially extending flange at one end for mounting the body on a deck of a vessel, said body having a plurality of diametral bores therein, guide members slidable in two of the bores, another one of the bores being threaded, a threaded shaft turnable and axially movable in said threaded bore, a clamp plate carried by said shaft and guide members, and handles for turning the threaded shaft to advance and retract the clamp plate with respect to said body, said clamp plate having a pair of wedge-shaped jaws formed with ridges and grooves for engaging a rope, said body having a series of circumferentially spaced recesses facing the clamp plate so that the engaged rope is secured between the jaws and body at said recesses when the threaded shaft is tightened.

2. A vise-like lock for a rope or cable comprising a cylindrical body having an annular radially extending flange at one end for mounting the body on a deck of a vessel, said body having a plurality of diametral bores therein, guide members slidable in two of the bores, another one of the bores being threaded, a threaded shaft turnable and axially movable in said threaded bore, a clamp plate carried by said shaft and guide members, handles for turning the threaded shaft to advance and retract the clamp plate with respect to said body, said clamp plate having a pair of wedge-shaped jaws formed with ridges and grooves for engaging a rope, said body having a series of circumferentially spaced recesses facing the clamp plate so that the engaged rope is secured between the jaws and body at said recesses when the threaded shaft is tightened, and a removable closure plate on said body at ends of said bores providing access thereto for lubricating said guide members and threaded shaft.

References Cited in the file of this patent

UNITED STATES PATENTS

| | | |
|---|---|---|
| 315,614 | Hall | Apr. 14, 1885 |
| 415,965 | Fletcher | Nov. 26, 1889 |
| 1,229,753 | Karolle et al. | June 12, 1917 |
| 1,670,194 | Fontaine | May 15, 1928 |
| 2,237,683 | Minor | Apr. 8, 1941 |
| 2,462,969 | Holliday | Mar. 1, 1949 |

FOREIGN PATENTS

| | | |
|---|---|---|
| 2,199 | Great Britain | June 15, 1875 |